United States Patent
Yamabe et al.

(10) Patent No.: US 11,283,368 B2
(45) Date of Patent: Mar. 22, 2022

(54) OPEN PHASE DETECTION SYSTEM FOR POWER CONVERSION SYSTEM

(71) Applicant: TOSHIBA MITSUBISHI-ELECTRIC INDUSTRIAL SYSTEMS CORPORATION, Chuo-ku (JP)

(72) Inventors: Kenta Yamabe, Tokyo (JP); Yoshihiro Tawada, Tokyo (JP); Tomoya Katsukura, Tokyo (JP)

(73) Assignee: TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 0 days.

(21) Appl. No.: 17/057,382

(22) PCT Filed: May 14, 2019

(86) PCT No.: PCT/JP2019/019178
§ 371 (c)(1),
(2) Date: Nov. 20, 2020

(87) PCT Pub. No.: WO2020/230273
PCT Pub. Date: Nov. 19, 2020

(65) Prior Publication Data
US 2021/0203249 A1 Jul. 1, 2021

(51) Int. Cl.
*H02M 7/493* (2007.01)
*H02P 29/024* (2016.01)
(Continued)

(52) U.S. Cl.
CPC ............ *H02M 7/493* (2013.01); *H02M 1/126* (2013.01); *H02M 1/32* (2013.01); *H02P 27/06* (2013.01); *H02P 29/0243* (2016.02)

(58) Field of Classification Search
CPC ........ H02M 7/493; H02M 1/126; H02M 1/32; H02P 29/0243; H02P 27/06
See application file for complete search history.

(56) References Cited

U.S. PATENT DOCUMENTS

| | | | | |
|---|---|---|---|---|
| 6,118,680 | A * | 9/2000 | Wallace | H02M 7/493 363/71 |
| 2005/0073783 | A1* | 4/2005 | Luo | H02M 7/493 361/62 |

(Continued)

FOREIGN PATENT DOCUMENTS

| | | |
|---|---|---|
| JP | 2007-37215 A | 2/2007 |
| JP | 2008-35655 A | 2/2008 |

(Continued)

OTHER PUBLICATIONS

International Search Report dated Jul. 16, 2019 in PCT/JP2019/019178 filed on May 14, 2019.

(Continued)

*Primary Examiner* — Jue Zhang
(74) *Attorney, Agent, or Firm* — Oblon, McClelland, Maier & Neustadt, L.L.P.

(57) ABSTRACT

An open phase detection system for a power conversion system includes a phase difference abnormality detection unit, an amplitude difference abnormality detection unit, and an open phase determination unit. The phase difference abnormality detection unit outputs a phase difference abnormality signal when an absolute value of a phase difference between a current flowing through a reactor and a current flowing through a capacitor is equal to or smaller than a phase threshold value. The amplitude difference abnormality detection unit outputs an amplitude difference abnormality signal when an absolute value of a value based on an amplitude difference between the current flowing through the reactor and the current flowing through the capacitor is equal to or smaller than an amplitude threshold value. The open phase determination unit outputs an open phase signal when receiving inputs of both the phase difference abnormality signal and amplitude difference abnormality signal.

7 Claims, 3 Drawing Sheets

(51) Int. Cl.
H02M 1/12 (2006.01)
H02M 1/32 (2007.01)
H02P 27/06 (2006.01)

(56) References Cited

U.S. PATENT DOCUMENTS

2017/0005527 A1* 1/2017 Ishihara ................. H02J 50/80
2018/0269771 A1* 9/2018 Mori ....................... H02M 1/00

FOREIGN PATENT DOCUMENTS

JP 2018-148674 A 9/2018
JP 2019-47664 A 3/2019

OTHER PUBLICATIONS

Examination report dated Jan. 4, 2022 in corresponding Indian Patent Application No. 202017049921 (6 pages).

* cited by examiner

OPEN PHASE DETECTION SYSTEM FOR POWER CONVERSION SYSTEM

FIELD

The present disclosure relates to an open phase detection system for a power conversion system.

BACKGROUND

PTL 1 discloses a power conversion system that converts DC power generated by a photovoltaic cell into AC power and supplies it to a power system. The power conversion system includes: an inverter that converts DC power into AC power; and an LC filter that reduces ripples in the AC output of the inverter. This LC filter is a low-pass filter constituted of a reactor (L) and a capacitor (C).

As for the AC output of an inverter, when at least one phase comes into an open phase state (hereinafter, simply referred to as an "open phase"), it is necessary to stop the inverter. For example, PTL 2 discloses an open phase detection system. According to the open phase detection system, the output current of an inverter is detected by an output current detection circuit; and if the current of at least one phase is zero, it is determined to be an open phase and the inverter is stopped.

CITATION LIST

Patent Literature

[PTL 1] JP 2019-47664 A
[PTL 2] JP 2007-37215 A

SUMMARY

Technical Problem

An open phase detection in a power conversion system in which an LC filter is connected on an AC output side of an inverter, such as in PTL 1, will be examined.

FIG. 3 is a view for explaining a current $I_{INV}$ flowing through a reactor (L) and a current $I_C$ flowing through a capacitor (C) in a normal condition where an open phase does not occur. A solid line 31 is a waveform showing a current $I_{INV}$ in a case where the power conversion system is operating with a low output. A solid line 32 is a waveform showing a current $I_{INV}$ in a case where the power conversion system is operating with a higher output than the solid line 31 (for example, rated output). A broken line 33 is a waveform showing a current $I_C$. The phase of the current $I_C$ advances the phase of the current $I_{INV}$ by 90°.

As shown by the solid line 32, when the power conversion system is operating with a high output, a current flowing through a reactor (L) is very large in comparison with a current flowing through the capacitor (C) ($|I_{INV}|>>|I_C|$). On the other hand, when an open phase occurs, a current does not flow to a power system side; and the amplitudes of currents flowing through the reactor (L) and capacitor (C) become equal. Focusing on this point, it can be considered that if an amplitude difference between the amplitude $|I_{INV}|$ of a current flowing through the reactor (L) and the amplitude $|I_C|$ of a current flowing through the capacitor (C) is detected to be nearly zero, it is determined as an open phase.

However, in open phase detection using only current amplitudes, when a power conversion system (PCS) is in low output (a solid line 31 in FIG. 3), an open phase may be erroneously detected. This is because an operation point satisfying $|I_{INV}|=|I_C|$ exists depending on a detection error of a sensor, the percent impedance (% Z) of an upper-level system, etc. For example, there may be such a case in which the power generation capacity of a photovoltaic cell is small due to a bad weather and the PCS continues to be operated with a low output.

The present disclosure has been made in order to solve the above-mentioned problem. It is an object of the present disclosure to provide an open phase detection system for a power conversion system in which the erroneous detection of an open phase can be reduced.

Solution to Problem

In one embodiment, an open phase detection system for a power conversion system includes a first current detection unit, a second current detection unit, a phase difference abnormality detection unit, an amplitude difference abnormality detection unit, and an open phase determination unit. The power conversion system includes an LC filter constituted by a reactor and a capacitor, the LC filter being connected to an AC output terminal of an inverter.

The first current detection unit detects a current flowing through the reactor. The second current detection unit detects a current flowing through the capacitor. The phase difference abnormality detection unit outputs a phase difference abnormality signal when an absolute value of a phase difference between a current flowing through the reactor and a current flowing through the capacitor is equal to or smaller than a phase threshold value. The amplitude difference abnormality detection unit outputs an amplitude difference abnormality signal when an absolute value of a value based on an amplitude difference between the current flowing through the reactor and the current flowing through the capacitor is equal to or smaller than an amplitude threshold value. The open phase determination unit outputs an open phase signal when receiving inputs of both the phase difference abnormality signal and amplitude difference abnormality signal In another embodiment, an open phase detection system for a power conversion system includes a first current detection unit, a second current detection unit, a phase difference abnormality detection unit, an amplitude difference abnormality detection unit, and an open phase determination unit. The power conversion system includes: an inverter that has a plurality of AC output terminals; and a plurality of LC filters each of which is constituted by a reactor and a capacitor and is connected to each of the plurality of AC output terminals. The first current detection unit detects a current flowing through the reactor of each of the plurality of LC filters. The second current detection unit detects a current flowing through the capacitor of each of the plurality of LC filters. The phase difference abnormality detection unit outputs a phase difference abnormality signal when an absolute value of a phase difference between a current flowing through the reactor which is connected to one AC output terminal of the plurality of AC output terminals and a current flowing through the capacitor which is connected to the one AC output terminal is equal to or smaller than a phase threshold value. The amplitude difference abnormality detection unit outputs an amplitude difference abnormality signal when an absolute value of a value based on an amplitude difference between the current flowing through the reactor which is connected to the one AC output terminal and the current flowing through the capacitor which is connected to the one AC output terminal is equal to or smaller than an amplitude threshold value. The open phase determination unit outputs an open phase signal when receiving inputs of both the phase difference abnormality signal and amplitude difference abnormality signal.

Advantageous Effects of Invention

According to present disclosure, by using both the amplitude and phase of a current for open phase determination conditions, the accuracy of detecting an open phase can be improved. As a result, the erroneous detection of an open phase can be reduced and application to an authentication test for which a severe detection accuracy is required becomes possible.

DESCRIPTION OF EMBODIMENTS

Figure 1:
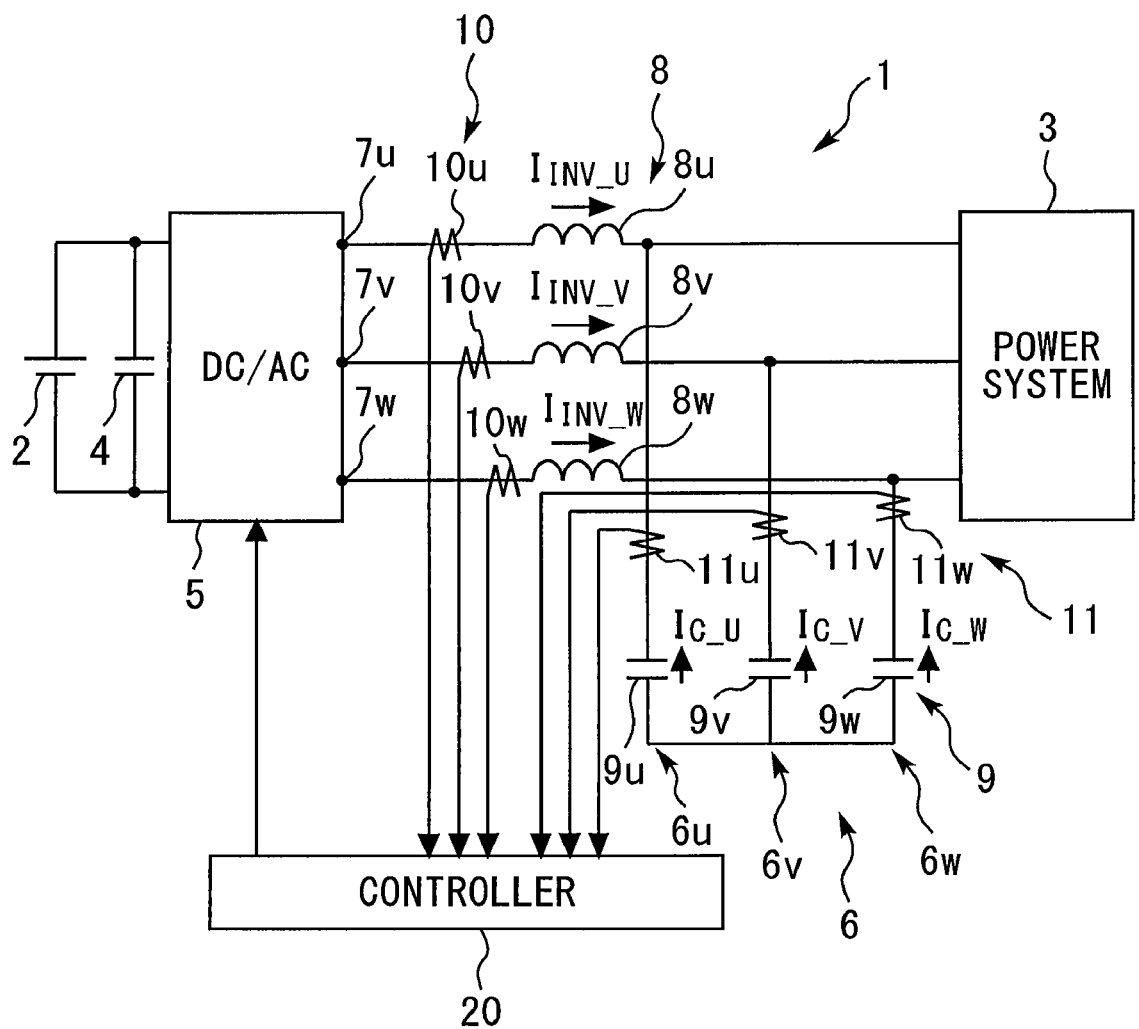
FIG. 1 is a view for explaining a power conversion system in a first embodiment of the present disclosure.

Embodiments of the present disclosure will now be described with reference to attached drawings. It should be noted that in the drawings, identical or corresponding parts are denoted by the same reference signs. Repeated explanation of such parts is appropriately simplified or omitted.

First Embodiment (Power Conversion System)

FIG. 1 is a view for explaining a power conversion system in a first embodiment of the present disclosure.

A power conversion system 1 is connected to a DC power supply 2 and a power system 3. The DC power supply 2 is, for example, a photovoltaic power generator provided with a photovoltaic panel; a storage battery; or the like.

The power conversion system 1 converts DC power supplied from the DC power supply 2, into AC power and supplies it to the power system 3.

The power conversion system 1 includes a smoothing capacitor 4, an inverter 5, a filter 6, and a controller 20.

The smoothing capacitor 4, which is connected between a positive electrode side and negative electrode side of the DC power supply 2, smooths fluctuations in an inter-terminal voltage.

The inverter 5 converts DC power from the DC power supply 2, into AC power and outputs it to the power system 3. The inverter 5 may be either a single phase or multiphase one. For one example, the following description will be made on the assumption that the inverter 5 is a three-phase voltage inverter.

The three-phase voltage inverter has a circuit in which three legs (U-phase leg, V-phase leg, and W-phase leg) are connected in parallel. Each of the legs is constituted by connecting in series two arms in each of which a switching element and a reflux diode are connected in reverse parallel.

Each of the legs is connected in parallel between the positive electrode side and negative electrode side of the DC power supply 2.

The inverter 5 includes three AC output terminals 7 (U-phase AC output terminal 7u, V-phase AC output terminal 7v, and W-phase AC output terminal 7w). The U-phase AC output terminal 7u is connected to a middle point of the U-phase leg. The V-phase AC output terminal 7v is connected to a middle point of the V-phase leg. The W-phase AC output terminal 7w is connected to a middle point of the W-phase leg.

The filter 6 is provided between the inverter 5 and the power system 3. The filter 6 is constituted by combining three LC filters (6u, 6v, 6w). The three LC filters (6u, 6v, 6w) are respectively connected to the three AC output terminals (7u, 7v, 7w).

Each of the LC filters (6u, 6v, 6w) is constituted of a reactor 8 and a capacitor 9. A reactor 8u and a capacitor 9u are provided between the U-phase AC output terminal 7u and the power system 3. A reactor 8v and a capacitor 9v are provided between the V-phase AC output terminal 7v and the power system 3. A reactor 8w and a capacitor 9w are provided between the W-phase AC output terminal 7w and the power system 3.

Each of the LC filters (6u, 6v, 6w) is a low pass filter. Each of the LC filters (6u, 6v, 6w) reduces ripples generated due to the switching of each of the switching elements of the inverter 5, by the filtering effect of the reactor and capacitor.

(Open Phase Detection System)

An open phase detection system is constituted of a first current detection unit 10, a second current detection unit 11, and the controller 20.

The first current detection unit 10 includes a U-phase first current detector 10u, a V-phase first current detector 10v, and a W-phase first current detector 10w. The first current detection unit 10 detects currents ($I_{INV\_U}$, $I_{INV\_V}$, $I_{INV\_W}$) flowing through the respective reactors (8u, 8v, 8w) of the three LC filters (6u, 6v, 6w).

The second current detection unit 11 includes a U-phase second current detector 11u, a V-phase second current detector 11v, and a W-phase second current detector 11w. The second current detection unit 11 detects currents ($I_{C\_U}$, $I_{C\_V}$, $I_{C\_W}$) flowing through the respective capacitors (9u, 9v, 9w) of the three LC filters (6u, 6v, 6w).

The controller 20 receives an input signal which includes: a power command according to output supply to the power system 3, which is input from outside of the power conversion system 1; an output current of the inverter 5; etc. The controller 20 generates, based on the input signal, a gate signal that drives each of the switching elements of the inverter 5. By the gate signal, the output power of the inverter 5 is controlled in PWM (Pulse Width Modulation).

Figure 2:
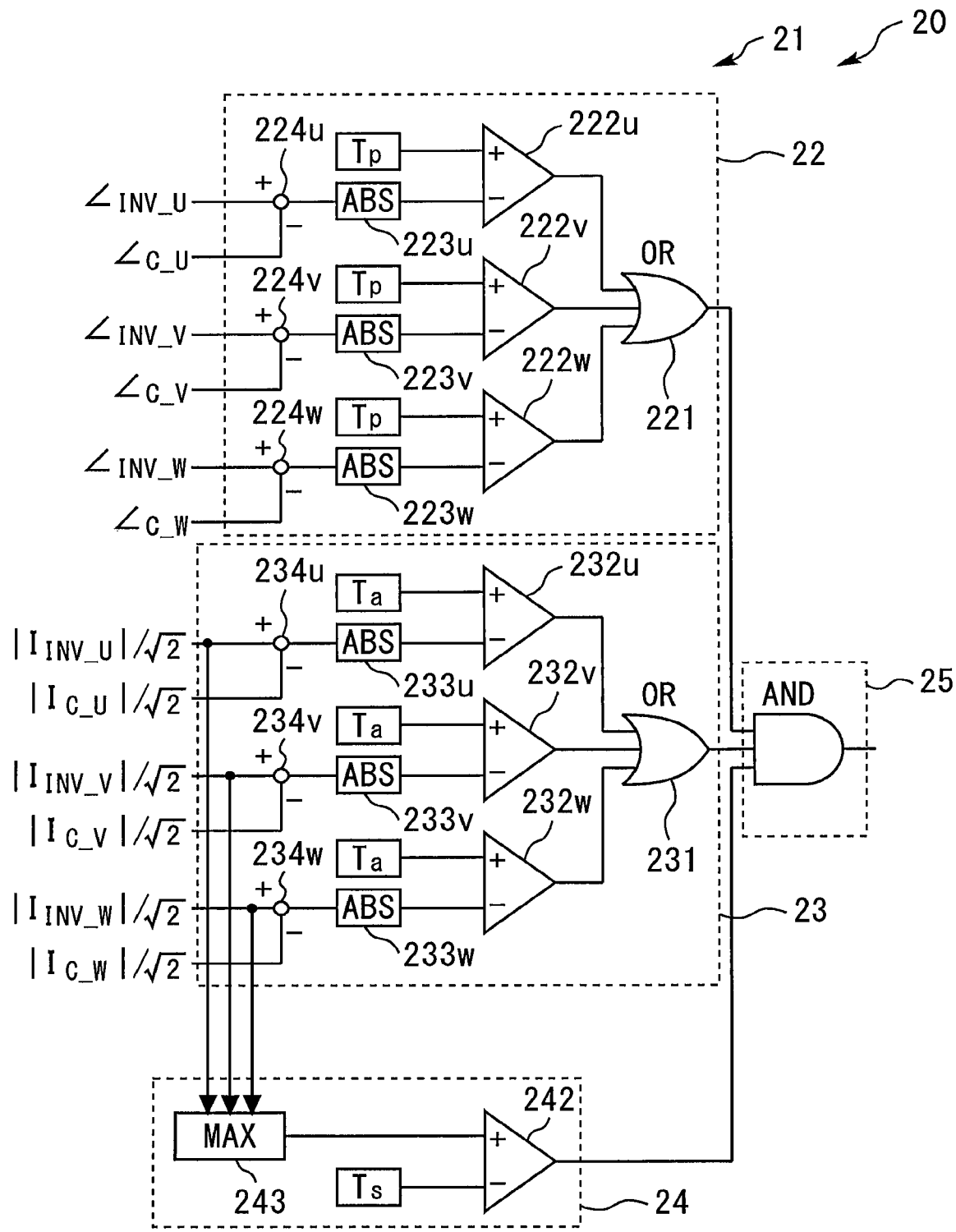
FIG. 2 is a circuit block diagram showing an open phase detection unit of a controller in the first embodiment of the present disclosure.

In addition, the controller 20 includes an open phase detection unit 21. With reference to a circuit block diagram in FIG. 2, the open phase detection unit 21 will be described.

The open phase detection unit 21 receives currents ($I_{INV\_U}$, $I_{INV\_V}$, $I_{INV\_W}$) flowing through the reactors (8u, 8v, 8w) which are detected by the first current detection unit 10. The open phase detection unit 21 receives currents ($I_{C\_U}$, $I_{C\_V}$, $I_{C\_W}$) flowing through the capacitors (9u, 9v, 9w) which are detected by the second current detection unit 11.

The open phase detection unit 21 includes: a phase difference abnormality detection unit 22, an amplitude difference abnormality detection unit 23, a detection start determination unit 24, and an open phase determination unit 25.

The phase difference abnormality detection unit 22 receives inputs of both the phases (∠$_{INV\_U}$, ∠$_{INV\_V}$, ∠$_{INV\_W}$) of currents each flowing through each of the reactors (8*u*, 8*v*, 8*w*) and the phases (Z$_{C\_U}$, Z$_{C\_V}$, Z$_{C\_W}$) of currents each flowing through each of the capacitors (9*u*, 9*v*, 9*w*); and outputs a phase difference signal (phase difference normality signal or phase difference abnormality signal).

A more concrete description will be given below. The phase difference abnormality detection unit 22 includes an OR circuit 221, three comparators (222*u*, 222*v*, 222*w*), three absolute value circuits (223*u*, 223*v*, 223*w*), and three subtractors (224*u*, 224*v*, 224*w*).

The OR circuit 221 is connected to the three comparators (222*u*, 222*v*, 222*w*). The comparator 222*u* is connected to the absolute value circuit 223*u*. The absolute value circuit 223*u* is connected to the subtractor 224*u*. The comparator 222*v* is connected to the absolute value circuit 223*v*. The absolute value circuit 223*v* is connected to the subtractor 224*v*. The comparator 222*w* is connected to the absolute value circuit 223*w*. The absolute value circuit 223*w* is connected to the subtractor 224*w*.

Next, abnormality detection processing for each phase by the phase difference abnormality detection unit 22 will be described.

First, description for a U phase will be given. The subtractor 224*u* outputs a phase difference between a phase ∠$_{INV\_U}$ and a phase ∠$_{C\_U}$. The absolute value circuit 223*u* outputs an absolute value of the phase difference. The comparator 222*u* outputs a phase difference signal based on a result of comparison between the absolute value of the phase difference and a phase threshold value Tp. Specifically, the comparator 222*u* outputs a phase difference normality signal when the absolute value of the phase difference is greater than the phase threshold value Tp. The comparator 222*u* outputs a phase difference abnormality signal when the absolute value of the phase difference is equal to or smaller than the phase threshold value Tp. Preferably, the phase threshold value Tp is equal to or greater than 0° and equal to or smaller than 10°.

Figure 3:
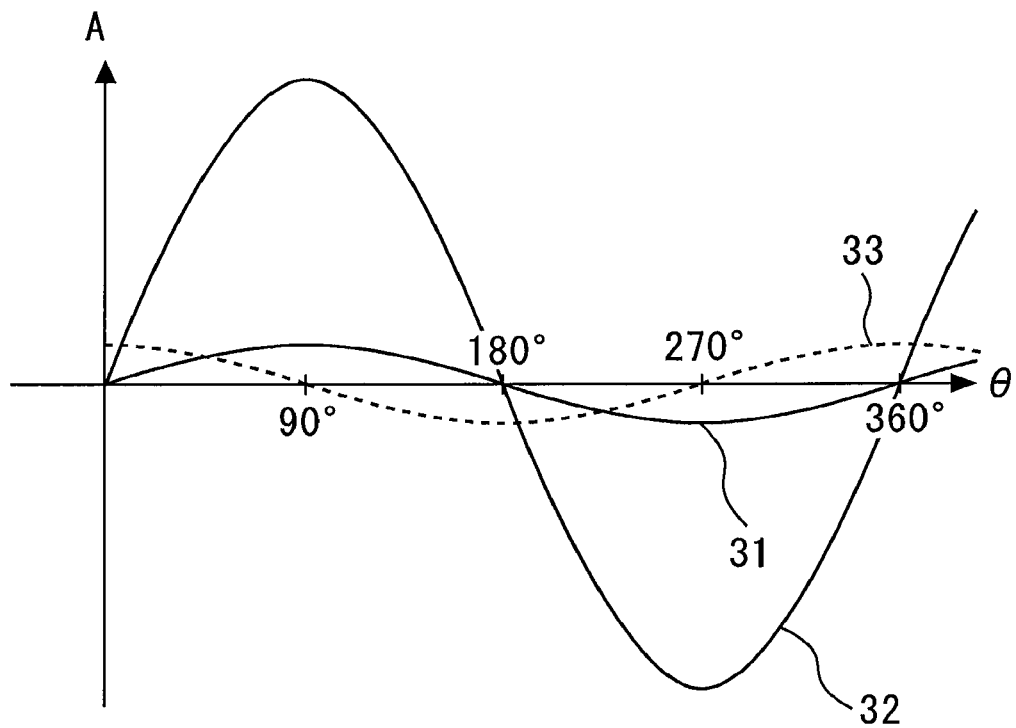
FIG. 3 is a view for explaining a current $I_{INV}$ flowing through a reactor (L) and a current $I_C$ flowing through a capacitor (C) in a normal condition where an open phase does not occur.
Figure 4:
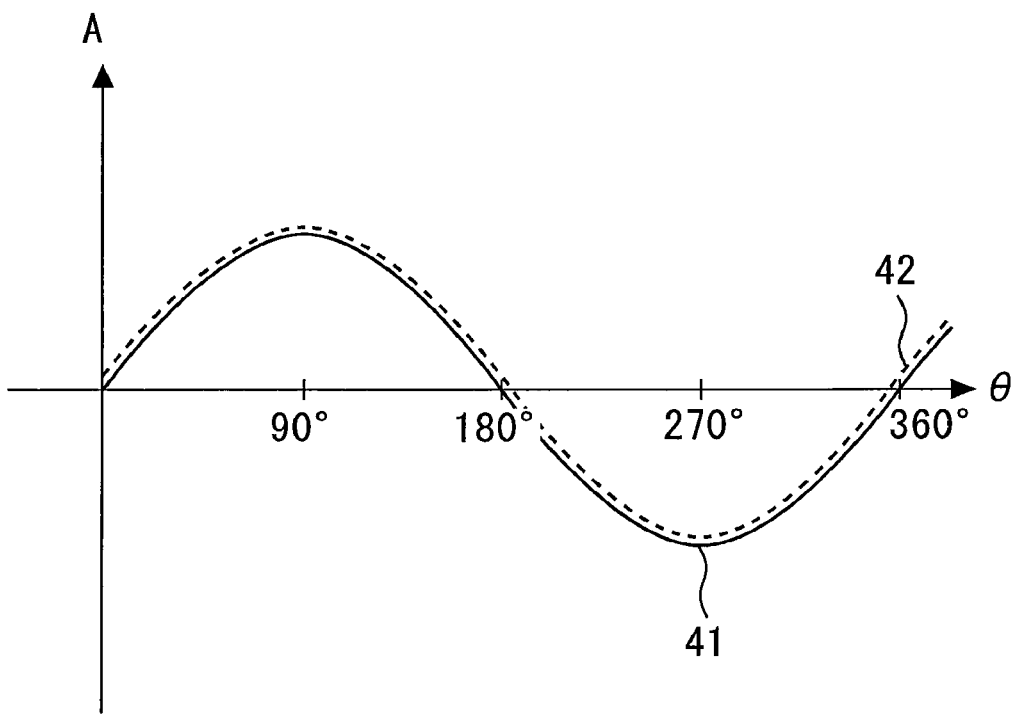
FIG. 4 is a view for explaining a current $_{INV}$ flowing through the reactor (L) and a current $I_C$ flowing through the capacitor (C) in an open phase condition.

With reference to FIG. 3 and FIG. 4, one example will be described. FIG. 4 is a view for explaining a current I$_{INV}$ flowing through the reactor (L) and a current I$_C$ flowing through the capacitor (C) in an open phase condition. A solid line 41 is a waveform showing a current I$_{INV}$ flowing through the reactor (L) in an open phase condition. A broken line 42 is a waveform showing a current I$_C$ flowing through the capacitor (C) in an open phase condition. In the open phase condition, a current does not flow to a power system 3 side. Therefore, the waveforms of currents flowing through the reactor (L) and capacitor (C) have an identical amplitude and identical phase. The phase difference abnormality detection unit 22 outputs a phase difference abnormality signal when the waveforms of currents flowing through the reactor (L) and capacitor (C) have an identical phase.

For example, assume that the phase threshold value Tp is 10°. In a normal condition where an open phase does not occur, a phase difference between the phase of a current flowing through the reactor and the phase of a current flowing through the capacitor is 90° (solid line 32 and broken line 33 in FIG. 3). At this time, the absolute value of the phase difference is greater than the phase threshold value Tp; and the comparator 222*u* outputs 0 (phase difference normality signal). On the other hand, in an open phase condition, as described above, a phase difference between the phase of a current flowing through the reactor and the phase of a current flowing through the capacitor is almost zero (FIG. 4). At this time, the absolute value of the phase difference is equal to or smaller than the phase threshold value Tp; and the comparator 222*u* outputs 1 (phase difference abnormality signal).

Next, description for a V phase will be given. The subtractor 224*v* outputs a phase difference between a phase ∠$_{INV\_V}$ and a phase ∠$_{C\_V}$. The absolute value circuit 223*v* outputs an absolute value of the phase difference. The comparator 222*v* outputs a phase difference signal based on a result of comparison between the absolute value of the phase difference and the phase threshold value Tp. Specifically, the comparator 222*v* outputs a phase difference normality signal when the absolute value of the phase difference is greater than the phase threshold value Tp. The comparator 222*v* outputs a phase difference abnormality signal when the absolute value of the phase difference is equal to or smaller than the phase threshold value Tp.

Next, description for a W phase will be given. The subtractor 224*w* outputs a phase difference between a phase ∠$_{INV\_W}$ and a phase ∠$_{C\_W}$. The absolute value circuit 223*w* outputs an absolute value of the phase difference. The comparator 222*w* outputs a phase difference signal based on a result of comparison between the absolute value of the phase difference and the phase threshold value Tp. Specifically, the comparator 222*w* outputs a phase difference normality signal when the absolute value of the phase difference is greater than the phase threshold value Tp. The comparator 222*w* outputs a phase difference abnormality signal when the absolute value of the phase difference is equal to or smaller than the phase threshold value Tp.

The OR circuit 221 outputs a phase difference normality signal when receiving inputs of phase difference normality signals from all of the comparators (222*u*, 222*v*, 222*w*). On the other hand, it outputs a phase difference abnormality signal when receiving an input of a phase difference abnormality signal from at least one of the comparators (222*u*, 222*v*, 222*w*). That is, the OR circuit 221 outputs a phase difference abnormality signal when an absolute value of a phase difference between a current flowing through the reactor and a current flowing through the capacitor is equal to or smaller than the phase threshold value Tp in at least one of the U phase, V phase, and W phase.

The amplitude difference abnormality detection unit 23 receives inputs of both the effective values (|I$_{INV\_U}$|/√2, |I$_{INV\_V}$|/√2, |I$_{INV\_W}$|/√2) of currents each flowing through each of the reactors (8*u*, 8*v*, 8*w*) and the effective values (|I$_{C\_U}$|/√2, |I$_{C\_V}$|/√2, |I$_{C\_W}$|/2) of currents each flowing through each of the capacitors (9*u*, 9*v*, 9*w*); and outputs an amplitude difference signal (amplitude difference normality signal or amplitude difference abnormality signal). It should be noted that the effective value of each of the currents is an average value of an absolute value of the current in a current waveform for prior one cycle.

A more concrete description will be given below. The amplitude difference abnormality detection unit 23 includes an OR circuit 231, three comparators (232*u*, 232*v*, 232*w*), three absolute value circuits (233*u*, 233*v*, 233*w*), and three subtractors (234*u*, 234*v*, 234*w*).

The OR circuit 231 is connected to the three comparators (232*u*, 232*v*, 232*w*). The comparator 232*u* is connected to the absolute value circuit 233*u*. The absolute value circuit 233*u* is connected to the subtractor 234*u*. The comparator 232*v* is connected to the absolute value circuit 233*v*. The absolute value circuit 233*v* is connected to the subtractor 234*v*. The comparator 232*w* is connected to the absolute value circuit 233*w*. The absolute value circuit 233*w* is connected to the subtractor 234*w*.

Next, abnormality detection processing for each phase by the amplitude difference abnormality detection unit 23 will be described.

First, description for the U phase will be given. The subtractor 234$u$ outputs a current effective value difference (a value based on an amplitude difference) between a current effective value $|I_{INV\_U}|/\sqrt{2}$ and a current effective value $|I_{C\_U}|/\sqrt{2}$. The absolute value circuit 233$u$ outputs an absolute value of the current effective value difference. The comparator 232$u$ outputs an amplitude difference signal based on a result of comparison between the absolute value of the current effective value difference and an amplitude threshold value Ta. Specifically, the comparator 232$u$ outputs an amplitude difference normality signal when the absolute value of the current effective value difference is greater than the amplitude threshold value Ta. The comparator 232$u$ outputs an amplitude difference abnormality signal when the absolute value of the current effective value difference is equal to or smaller than the amplitude threshold value Ta. Preferably, the amplitude threshold value Ta is equal to or less than 10% of the amplitude of a rated current.

With reference to FIG. 3 and FIG. 4, one example will be described. In an open phase condition, a current does not flow to a power system 3 side. Therefore, the waveforms of currents flowing through the reactor (L) and capacitor (C) have an identical amplitude and identical phase (solid line 41 and broken line 42 in FIG. 4). The amplitude difference abnormality detection unit 23 outputs an amplitude difference abnormality signal when the waveforms of currents flowing through the reactor (L) and capacitor (C) have an identical amplitude.

For example, assume that the amplitude threshold value Ta is 50 amperes. In a normal condition where an open phase does not occur, a current effective value difference between the effective value of a current flowing through the reactor and the effective value of a current flowing through the capacitor is several hundred amperes (solid line 32 and broken line 33 in FIG. 3). At this time, the absolute value of the current effective value difference is greater than the amplitude threshold Ta; and the comparator 232$u$ outputs 0 (amplitude difference normality signal). On the other hand, in an open phase condition, as described above, a current effective value difference between the effective value of a current flowing through the reactor and the effective value of a current flowing through the capacitor is almost zero (FIG. 4). At this time, the absolute value of the current effective value difference is equal to or smaller than the amplitude threshold value Ta; and the comparator 232$u$ outputs 1 (amplitude difference abnormality signal).

Next, description for the V phase will be given. The subtractor 234$v$ outputs a current effective value difference (a value based on an amplitude difference) between a current effective value $|I_{INV\_V}|/\sqrt{2}$ and a current effective value $|I_{C\_V}|/\sqrt{2}$. The absolute value circuit 233$v$ outputs an absolute value of the current effective value difference. The comparator 232$v$ outputs an amplitude difference signal based on a result of comparison between the absolute value of the current effective value difference and the amplitude threshold value Ta. Specifically, the comparator 232$v$ outputs an amplitude difference normality signal when the absolute value of the current effective value difference is greater than the amplitude threshold value Ta. The comparator 232$v$ outputs an amplitude difference abnormality signal when the absolute value of the current effective value difference is equal to or smaller than the amplitude threshold value Ta.

Next, description for a W phase will be given. The subtractor 234$w$ outputs a current effective value difference (a value based on an amplitude difference) between a current effective value $|I_{INV\_W}|/\sqrt{2}$ and a current effective value $|I_{C\_W}|/\sqrt{2}$. The absolute value circuit 233$w$ outputs an absolute value of the current effective value difference. The comparator 232$w$ outputs an amplitude difference signal based on a result of comparison between the absolute value of the current effective value difference and the amplitude threshold value Ta. Specifically, the comparator 232$w$ outputs an amplitude difference normality signal when the absolute value of the current effective value difference is greater than the amplitude threshold value Ta. The comparator 232$w$ outputs an amplitude difference abnormality signal when the absolute value of the current effective value difference is equal to or smaller than the amplitude threshold value Ta.

The OR circuit 231 outputs an amplitude difference normality signal when receiving inputs of the amplitude difference normality signals from all of the comparators (232$u$, 232$v$, 232$w$). On the other hand, it outputs an amplitude difference abnormality signal when receiving an input of an amplitude difference abnormality signal from at least one of the comparators (232$u$, 232$v$, 232$w$). That is, the OR circuit 231 outputs an amplitude difference abnormality signal when the absolute value of a value based on an amplitude difference between a current flowing through the reactor and a current flowing through the capacitor is equal to or smaller than the amplitude threshold value Ta in at least one of the U phase, V phase, and W phase.

The detection start determination unit 24 receives inputs of the effective values ($|I_{INV\_U}|/\sqrt{2}$, $|I_{INV\_V}|/\sqrt{2}$, $|I_{INV\_W}|/\sqrt{2}$) (values based on amplitudes) of currents each flowing through each of the reactors (8$u$, 8$v$, 8$w$); and outputs a detection start signal.

A more concrete description will be given below. The detection start determination unit 24 includes a comparator 242 and a maximum value detector 243. The comparator 242 is connected to the maximum value detector 243.

Next, abnormality detection start processing by the detection start determination unit 24 will be described. The maximum value detector 243 detects the maximum value out of the effective values of currents each flowing through each of the reactors (8$u$, 8$v$, 8$w$).

The comparator 242 outputs a detection start signal when the maximum value is greater than a second amplitude threshold value Ts, that is, when there is a prescribed output. Preferably, the second amplitude threshold value Ts is greater than the amplitude threshold value Ta.

That is, the detection start determination unit 24 outputs a detection start signal when a value based on the maximum amplitude of currents flowing through the respective reactors (8$u$, 8$v$, 8$w$) of the plurality of LC filters (6$u$, 6$v$, 6$w$) is greater than the second amplitude threshold value Ts.

The detection start determination unit 24 allows abnormality detection processing in the phase difference abnormality detection unit 22 and amplitude difference abnormality detection unit 23 to be started after a period such as the startup time of the power conversion system 1, in which the amplitude of an inverter current is almost the same as the amplitude of a capacitor current, has passed and its operation is stabilized.

The open phase determination unit 25 outputs an open phase signal when receiving inputs of: a detection start signal which is output from the detection start determination unit 24; a phase difference abnormality signal which is output from the phase difference abnormality detection unit 22; and an amplitude difference abnormality signal which is output from the amplitude difference abnormality detection unit 23. That is, it outputs an open phase signal when a state where the detection start signal is output and, as shown in FIG. 4, a state where the waveforms of currents flowing through the reactor (L) and capacitor (C) have an identical amplitude and identical phase are set.

An alarm issuing unit (not illustrated) of the controller 20 receives an input of an open phase signal. When receiving an input of the open phase signal, the alarm issuing unit issues an alarm using a screen dialog, sound, lamp, etc. so as to notify an operator of the occurrence of an open phase.

According to the above-described open phase detection system for the power conversion system, with regard to currents flowing through the reactors and capacitors of the LC filters, both the amplitudes and phases of the currents are used for open phase determination conditions in open phase detection and therefore, the accuracy of detecting an open phase can be improved. As a result, the erroneous detection of an open phase can be reduced and application to an authentication test for which a severe detection accuracy is required becomes possible.

(Modification)

The open phase detection system in the first embodiment described above is provided with the detection start determination unit 24; however, it may have a configuration in which the detection start determination unit 24 is not included. In this case, the open phase determination unit 25 outputs an open phase signal when receiving inputs of both the phase difference abnormality signal and amplitude difference abnormality signal.

In addition, the open phase detection system in the first embodiment described above uses a "current effective value" in the amplitude difference abnormality detection unit 23; however, it may use the "amplitude of a current" instead of it. In this case, a "value based on an amplitude difference" is a difference between the amplitude of a current flowing through the reactor and the amplitude of a current flowing through the capacitor.

Further, the open phase detection system in the first embodiment described above uses a "current effective value" in the detection start determination unit 24; however, it may use the "amplitude of a current" instead of it. In this case, the "values based on amplitudes" are the amplitudes of currents flowing through the reactors.

Although the embodiments according to the present disclosure have been described above, the present disclosure is not limited to the above embodiments and various modifications can be made without departing from the scope of the present disclosure.

REFERENCE SIGNS LIST

1 Power conversion system
2 DC power supply
3 Power system
4 Smoothing capacitor
5 Inverter
6 Filter
6u, 6v, 6w LC filter
7 AC output terminal
7u U-phase AC output terminal
7v V-phase AC output terminal
7w W-phase AC output terminal
8u, 8v, 8w Reactor
9u, 9v, 9w Capacitor
10 First current detection unit
10u U-phase first current detector
10v V-phase first current detector
10w W-phase first current detector
11 Second current detection unit
11u U-phase second current detector
11v V-phase second current detector
11w W-phase second current detector
20 Controller
21 Open phase detection unit
22 Phase difference abnormality detection unit
23 Amplitude difference abnormality detection unit
24 Detection start determination unit
25 Open phase determination unit
221 OR circuit
222u, 222v, 222w Comparator
223u, 223v, 223w Absolute value circuit
224u, 224v, 224w Subtractor
231 OR circuit
232u, 232v, 232w Comparator
233u, 233v, 233w Absolute value circuit
234u, 234v, 234w Subtractor
242 Comparator
243 Maximum value detector
Tp Phase threshold value
Ta Amplitude threshold value
Ts Second amplitude threshold value

The invention claimed is:

1. An open phase detection system for a power conversion system including an LC filter constituted by a reactor and a capacitor, the LC filter being connected to an AC output terminal of an inverter; the open phase detection system comprising:
a first current detection unit for detecting a current flowing through the reactor;
a second current detection unit for detecting a current flowing through the capacitor;
a phase difference abnormality detection unit for outputting a phase difference abnormality signal when an absolute value of a phase difference between a current flowing through the reactor and a current flowing through the capacitor is equal to or smaller than a phase threshold value;
an amplitude difference abnormality detection unit for outputting an amplitude difference abnormality signal when an absolute value of a value based on an amplitude difference between the current flowing through the reactor and the current flowing through the capacitor is equal to or smaller than an amplitude threshold value; and
an open phase determination unit for outputting an open phase signal when receiving inputs of both the phase difference abnormality signal and amplitude difference abnormality signal.

2. The open phase detection system for the power conversion system according to claim 1, comprising:
a detection start determination unit for outputting a detection start signal when a value based on an amplitude of a current flowing through the reactor is greater than a second amplitude threshold value; wherein
the open phase determination unit outputs an open phase signal when receiving inputs of the detection start signal, the phase difference abnormality signal, and the amplitude difference abnormality signal.

3. An open phase detection system for a power conversion system including an inverter and a plurality of LC filters, the inverter having a plurality of AC output terminals, the LC filters each being constituted by a reactor and a capacitor and being connected to each of the plurality of AC output terminals; the open phase detection system comprising:

a first current detection unit for detecting a current flowing through the reactor of each of the plurality of LC filters;

a second current detection unit for detecting a current flowing through the capacitor of each of the plurality of LC filters;

a phase difference abnormality detection unit for outputting a phase difference abnormality signal when an absolute value of a phase difference between a current flowing through the reactor connected to one AC output terminal of the plurality of AC output terminals and a current flowing through the capacitor connected to the one AC output terminal is equal to or smaller than a phase threshold value;

an amplitude difference abnormality detection unit for outputting an amplitude difference abnormality signal when an absolute value of a value based on an amplitude difference between the current flowing through the reactor connected to the one AC output terminal and the current flowing through the capacitor connected to the one AC output terminal is equal to or smaller than an amplitude threshold value; and an open phase determination unit for outputting an open phase signal when receiving inputs of both the phase difference abnormality signal and the amplitude difference abnormality signal.

4. The open phase detection system for the power conversion system according to claim 3, comprising:

a detection start determination unit for outputting a detection start signal when a value based on a maximum amplitude of currents each flowing through the reactor of each of the plurality of LC filters is greater than a second amplitude threshold value; wherein the open phase determination unit outputs an open phase signal when receiving inputs of the detection start signal, the phase difference abnormality signal, and the amplitude difference abnormality signal.

5. The open phase detection system for the power conversion system according to claim 4, wherein the second amplitude threshold value is greater than the amplitude threshold value.

6. The open phase detection system for the power conversion system according to claim 3, wherein the phase threshold value is equal to or greater than 0° and equal to or smaller than 10°.

7. The open phase detection system for the power conversion system according to claim 3, wherein the amplitude threshold value is equal to or smaller than 10% of an amplitude of a rated current.

* * * * *